United States Patent
Osborn, Jr. et al.

(10) Patent No.: US 6,790,084 B1
(45) Date of Patent: Sep. 14, 2004

(54) WATERTIGHT FLUSH POKE-THRU COVER WITH SNAP-ON LIDS

(75) Inventors: Robert H. Osborn, Jr., Collierville, TN (US); Mark R. Drane, Germantown, TN (US); Roger Pyron, Bartlett, TN (US)

(73) Assignee: Thomas & Betts International, Inc., Wilmington, DE (US)

( * ) Notice: Subject to any disclaimer, the term of this patent is extended or adjusted under 35 U.S.C. 154(b) by 0 days.

(21) Appl. No.: 10/663,330

(22) Filed: Sep. 16, 2003

(51) Int. Cl.[7] ............................................. H01R 13/40
(52) U.S. Cl. ........................ 439/587; 439/138; 439/271; 439/283; 174/48
(58) Field of Search ................................ 439/587–588, 439/138, 271, 283; 174/48

(56) References Cited

U.S. PATENT DOCUMENTS

| | | |
|---|---|---|
| 2,605,926 A | 8/1952 | Casey |
| 2,797,840 A | 7/1957 | Gibbs |
| 3,956,573 A | 5/1976 | Myers et al. |
| 4,091,231 A | 5/1978 | Sotolongo |
| 4,293,173 A * | 10/1981 | Tricca ........................ 439/148 |
| 4,331,832 A | 5/1982 | Curtis et al. |
| 4,336,416 A | 6/1982 | Goodsell |
| 4,443,654 A | 4/1984 | Flachbarth et al. |
| 4,496,790 A | 1/1985 | Spencer |
| 4,573,297 A | 3/1986 | Benscoter et al. |
| 4,770,643 A | 9/1988 | Castellani et al. |
| 5,032,690 A | 7/1991 | Bloom |
| 5,107,871 A | 4/1992 | Butcher et al. |
| 5,160,808 A | 11/1992 | Hadfield |
| 5,167,351 A | 12/1992 | Prout et al. |
| 5,240,431 A * | 8/1993 | Yagi et al. .................. 439/271 |
| 5,272,278 A | 12/1993 | Wuertz |
| 5,306,178 A | 4/1994 | Huang |
| 5,422,434 A | 6/1995 | Wuertz et al. |
| 5,466,886 A | 11/1995 | Lengyel et al. |
| 5,571,023 A | 11/1996 | Anthony |
| 5,638,838 A | 6/1997 | Lombardi |
| 5,705,772 A | 1/1998 | Brown |
| 5,783,774 A | 7/1998 | Bowman et al. |
| 6,018,126 A | 1/2000 | Castellani et al. |
| 6,114,623 A | 9/2000 | Bonilla et al. |
| 6,175,078 B1 | 1/2001 | Bambardekar et al. |
| 6,179,634 B1 | 1/2001 | Hull et al. |
| 6,265,662 B1 | 7/2001 | Riedy et al. |
| 6,287,136 B1 * | 9/2001 | Deutsch ....................... 439/337 |
| 6,307,152 B1 | 10/2001 | Bonilla et al. |
| 6,341,984 B1 * | 1/2002 | Murakami et al. ........... 439/587 |
| 6,383,020 B2 * | 5/2002 | Taguchi et al. .............. 439/587 |
| 6,417,446 B1 | 7/2002 | Whitehead |
| 6,443,765 B2 * | 9/2002 | Ichio et al. .................. 439/587 |
| 6,478,619 B1 * | 11/2002 | Wiechmann ................ 439/587 |
| 6,518,498 B1 | 2/2003 | Bonilla et al. |
| 6,545,215 B2 | 4/2003 | Young et al. |
| 6,552,262 B2 | 4/2003 | English et al. |

* cited by examiner

Primary Examiner—Truc T. T. Nguyen
(74) Attorney, Agent, or Firm—Hoffmann & Baron, LLP

(57) ABSTRACT

A watertight modular system for floor-mounted electrical and/or data receptacles which includes a cover, a lid, a gasket and a base plate. The cover has a plurality of retaining walls extending downwardly from the lower surface and defining a plurality of enclosed regions and can also include a data port module which slidably engages a slot in the cover. The cover has at least one lid that includes a pivot mechanism at a first end for mounting the lid flush with the upper surface of the cover when in a closed position and for exposing the receptacle when in an open position and a snap-in mechanism at a second end for providing a positive hold in the closed position. When the base plate, gasket and cover are assembled, the top surface of the base plate is flush with the upper surface of the cover and the retaining walls and the continuous perimeter wall sealably contact the gasket.

20 Claims, 4 Drawing Sheets

WATERTIGHT FLUSH POKE-THRU COVER WITH SNAP-ON LIDS

FIELD OF THE INVENTION

The present invention relates to electrical and data termination modules and more specifically to watertight electrical and data termination modules which are flush mounted onto a floor.

BACKGROUND OF THE INVENTION

Many new offices and commercial workplaces are being designed to provide a more open and less confined environment. This trend has resulted in larger work spaces with fewer walls and fewer wall-mounted electrical receptacles. Building designers have found that floor-mounted electrical termination devices provide a convenient means for connecting electrical power and data/communication signals when wall-mounted receptacles are not readily accessible or unavailable.

Modern buildings with large open floor space are now designed with floor-mounted receptacles spaced at regular intervals to provide flexibility in reconfiguring the floor plan design. When the receptacles are not in use, they are covered with a plate (or cover) that protects them from being damaged. There are many different designs for these plates in the prior art with accessibility to the interior of the module which houses the receptacles and safety being two of the basic design criteria. Preferred floor-mounted receptacles are flush-mounted to the floor in order to prevent persons walking through the work space from tripping over the receptacle covers.

The floor-mounted junction boxes that are currently in use are not watertight. Typically, the junction boxes have covers with lids which are opened to access the receptacles. The lids are attached to the cover using a retaining clip and do not provide any sealing capability around the receptacle outlets. In one design, the lids are held in the closed position by three vertical ribs on the internal surface of the duplex cover which provide only a minimal amount of pressure against the lid's mating wall. Moreover, the duplex cover uses only one mounting screw located in the center of the cover so that the outer edges of the cover do not securely contact the carpet ring or base plate. Moreover, the internal shoulder for the recessed section of the base plate is discontinuous around the perimeter and prevents the cover plate from being tightly secured to the base plate.

Since floor-mounted receptacles are located at or below the level of the floor, they are susceptible to water leakage that can short-out and damage the circuits connected through the receptacle. This has led to new listing agency regulations that require poke-through receptacles with flush mounted covers to be "scrub-watertight," i.e., no water can penetrate the receptacle cover in the closed position and enter the receptacle openings where live electrical connections are present. Accordingly, there is a need for a flush cover for a floor-mounted receptacle which is watertight when not in use and which still provides easy access to floor-mounted receptacles.

SUMMARY OF THE INVENTION

The present invention is directed to a flush mounted cover used on modular poke-thru (poke-through) systems for floor-mounted receptacles. More particularly, the present invention is a watertight modular system for floor-mounted electrical and/or data receptacles which includes a cover, a lid, a gasket and a base plate.

The cover for the watertight modular system has a generally flat upper surface, a lower surface, and a cutout adapted to expose an electrical or data receptacle, wherein the lower surface has a plurality of retaining walls which extend downwardly from the lower surface and define a plurality of enclosed regions. The cutout has a continuous retaining wall which extends downwardly from the lower surface of the cover around the edge of the cutout. The cover can also include a data port module which slidably engages a slot in the cover. The slot has a continuous retaining wall around the edge which extends downwardly from the lower surface of the cover and defines the slot. The cover is preferably made from a non-metallic material such as a rubber or a plastic.

The lid is shaped to fill and cover the cutout and includes a pivot mechanism at a first end for mounting the lid flush with the upper surface of the cover when in a closed position and for exposing the receptacle when in an open position. The lid also has a snap-in mechanism at a second end for providing a positive hold in the closed position, and a continuous perimeter wall extending downwardly and beyond the retaining walls when the lid is in the closed position. The pivot mechanism has a slot which pivotably engages two prongs which extend outwardly from opposing sides of the first continuous retaining wall. In a preferred embodiment, the cover includes two lids for accessing electrical receptacles.

The gasket has a cutout adapted to expose the electrical or data receptacle that are being accessed through the cover. The gasket is preferably formed from a resilient, waterproof material, preferably a rubber or an elastomeric material.

The base plate has a top surface and a central portion recessed from the top surface for receiving the gasket and cover. The recessed central portion includes a continuous wall which extends downwardly from the upper surface. At the base of the wall, a shoulder extends inwardly to define an opening. In one embodiment, a detachable web is connected to the shoulder and extends across the opening to form a plurality of openings. When the base plate, gasket and cover are assembled, the top surface of the base plate is flush with the upper surface of the cover and the retaining walls and the continuous perimeter wall sealably contact the gasket.

BRIEF DESCRIPTION OF THE FIGURES

Other objects and many attendant features of this invention will be readily appreciated as the invention becomes better understood by reference to the following detailed description when considered in connection with the accompanying drawings wherein.

DETAILED DESCRIPTION OF THE INVENTION

The present invention provides improved covers for modular poke-through (poke-thru) systems which are used with floor-mounted receptacles. These covers (also referred to as "cover plates") are flush mounted onto a floor and can be made from metal, although non-metallic materials such as hard rubbers or plastics are preferred. These modular poke-thru systems provide a convenient means for accessing electrical, telephone and data connections via receptacles in a floor. The covers are an improvement of the junction box cover disclosed in U.S. Pat. No. 5,064,969 to Bloom, which is incorporated herein by reference in its entirety.

The covers of the present invention can have a variety of configurations to accommodate different types of connectors. The cover can be designed for a single receptacle, a duplex receptacle, single or duplex data/communication ports, or various combinations of receptacles and data/communication ports. The preferred configuration of the present invention has two lids for accessing a duplex electrical power receptacle and at least one poke-through for telephone or data/communication connectors. The watertight construction is achieved by providing the underside of the cover with ribs and retaining walls which isolate the different connections when they sealably contact the gasket.

Figure 1:
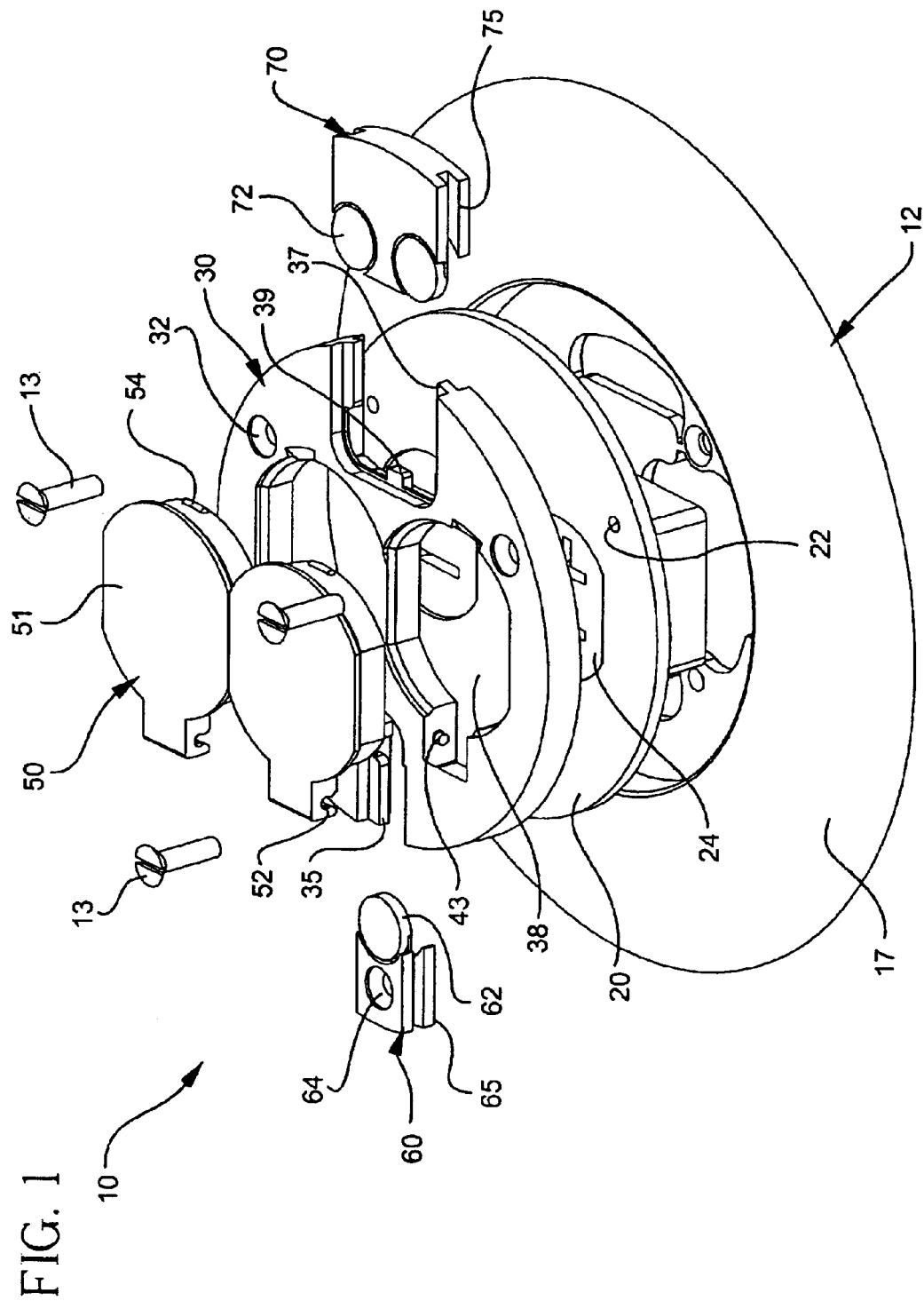
FIG. 1 is an exploded view of a watertight poke-thru system for a floor-mounted receptacle.
Figure 2:
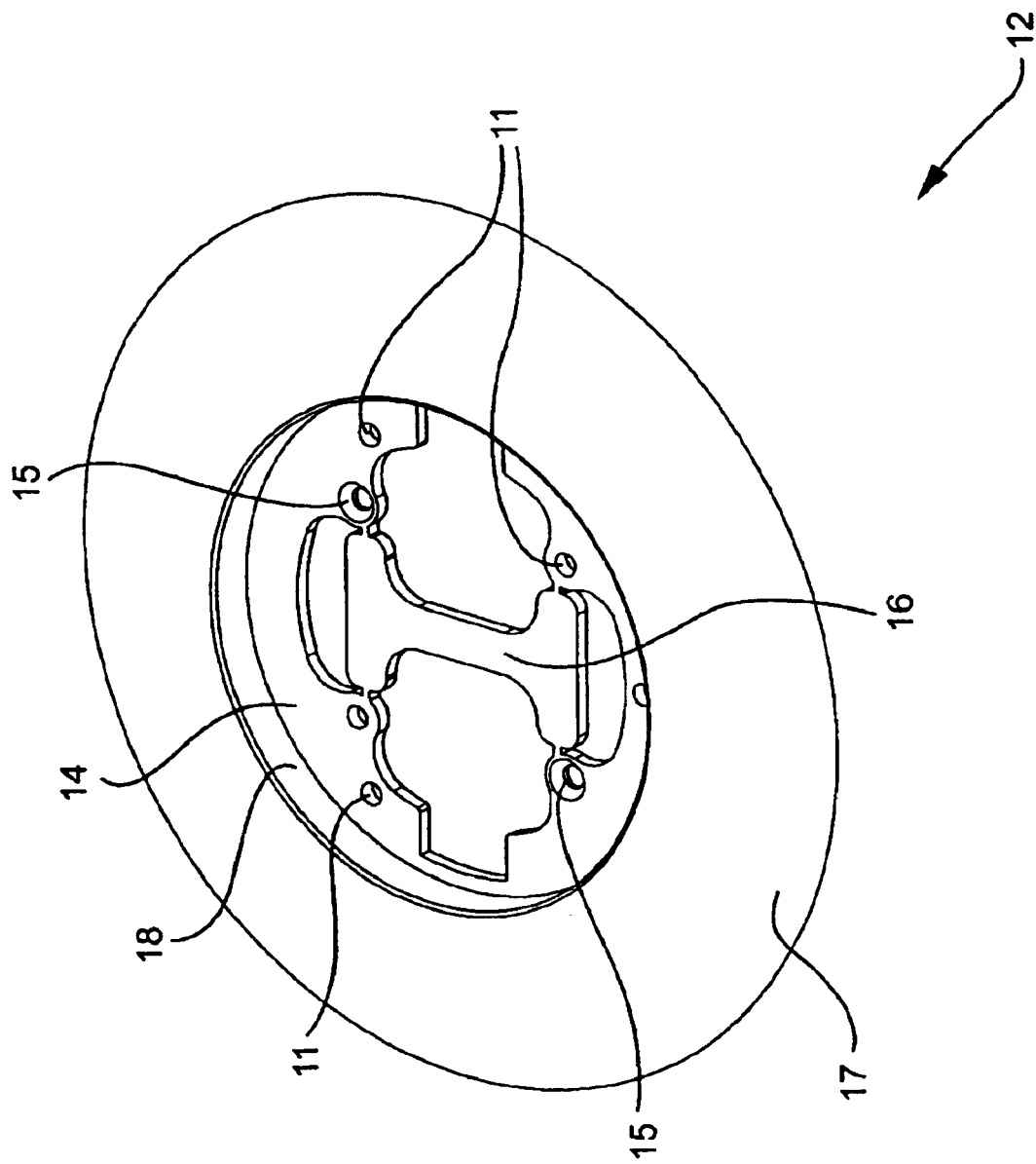
FIG. 2 shows the base plate of the watertight poke-thru system with a removable I-shaped web.

FIG. 1 shows an exploded view of the watertight poke-thru system 10 of the present invention which includes a base plate 12 (shown in more detail in FIG. 2), a gasket 20 and a cover 30. The base plate 12 (also referred to as a "carpet ring") is substantially round and has a concentric annular construction which forms a recessed opening for receiving the gasket 20 and cover 30. The gasket 20 is positioned between the cover 30 and the base plate 12 to provide a watertight seal. When the gasket 20 and cover 30 are secured to the base plate 12, the top surface 17 of the base plate 12 and the upper surface 31 of the cover 30 form a substantially smooth and continuous surface. FIG. 1 shows a preferred embodiment of the cover 30 which includes two snap-on lids 50, a slidably removable single data port module 70 and a slidably removable dual data port module 60. The cover 30 is secured to the base plate 12 by three mounting screws 13 that are spaced at equal distances to ensure a tight fit.

Figure 3:
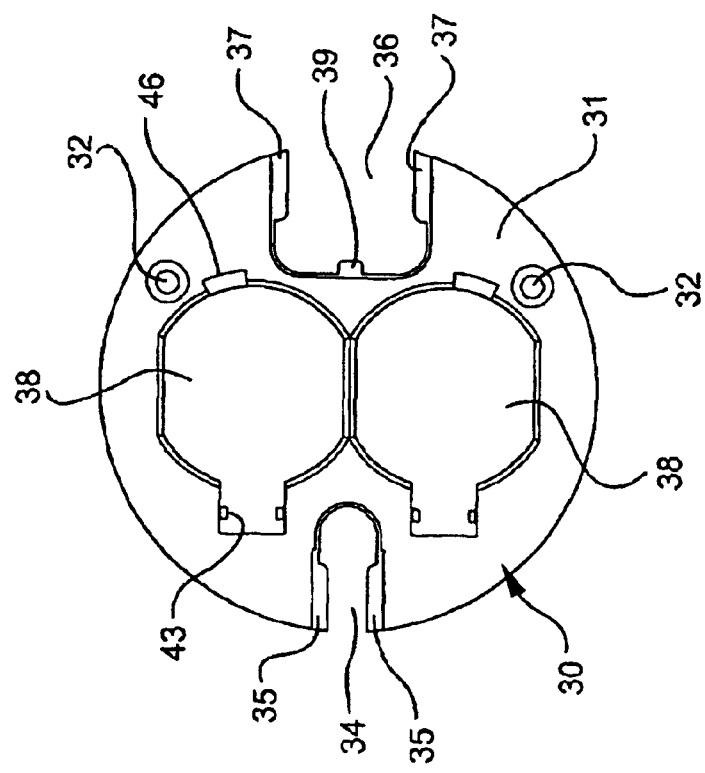
FIG. 3 is a view of the lower surface (or bottom side) of a duplex cover for the watertight poke-thru system.
Figure 4:
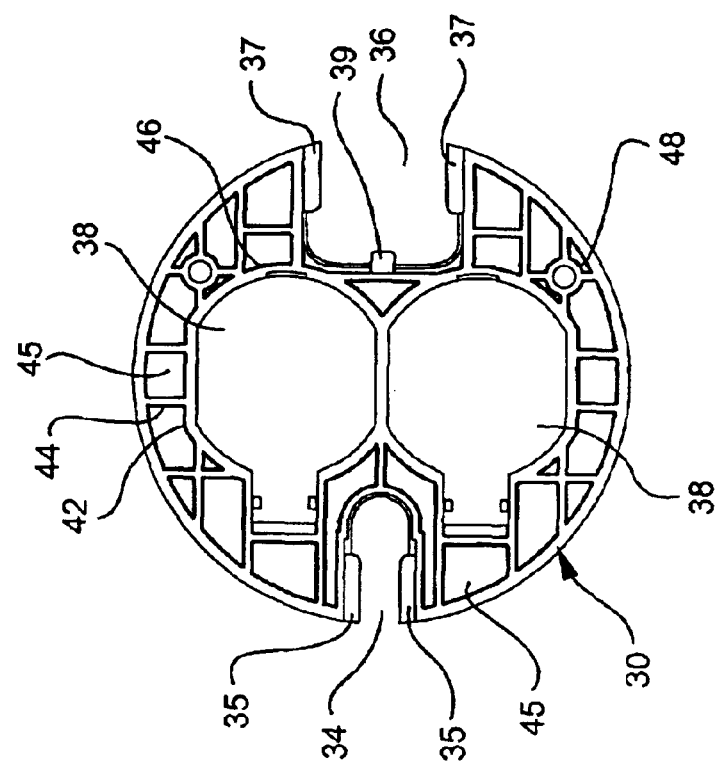
FIG. 4 is a view of the upper surface (or top side) of a duplex cover for the watertight poke-thru system.

FIGS. 3 and 4 show that the cover 30 has a substantially flat upper surface 31 and a lower surface 41 having a plurality of retaining walls 42 and ribs 44 extending downwardly to form a plurality of separate regions 45. The retaining walls 42 and ribs 44 provide the cover 30 with additional stiffness as well as an extensive sealing surface on the gasket 20. When the cover 30 is secured to the base plate 12, the retaining walls 42 and ribs 44 seal against the gasket 20 and provide a watertight seal for each of the separate regions 45. Thus, if any water gets into one of the regions 45, it will not affect receptacles and/or connectors in other regions 45.

The cover 30 includes at least one snap-on lid 50 which provides access to an electrical receptacle or data connector. As shown in FIGS. 1, 3 and 4, the cover 30 has a cutout 38 for each snap-on lid 50 which conforms to the shape of the lid 50 to provide a tight fit when the lid 50 is in the closed position. The cutout 38 has a retaining wall 42 which extends downwardly from the upper surface 31 of the cover 30 and which is continuous around the edge of the cutout 38. The retaining wall 42 surrounding the cutout 38 includes two cylindrical extensions or prongs 43 which extend outwardly from the retaining wall 42 and engage a snap-in mechanism 52 in the lid 50 to provide a means for mechanically attaching and pivotably opening and closing the lid 50.

The preferred embodiment of the present invention shown in FIG. 1 has a duplex cover 30 with two lids 50 for accessing two electrical receptacles. FIG. 3 shows the lower surface 41 of the cover which has a plurality of strategically located retaining walls 42, ribs 44 and bosses 48 that form a plurality of separate regions 45. The retaining walls 42, ribs 44 and bosses 48 also provide stiffness and increase the sealing surface. The three 3-point mounting screw configuration shown in FIG. 1 is preferred because it provides uniform sealing of the cover 30 to the gasket 20 that cannot be achieved using a single screw in the center of the cover.

Figure 5:
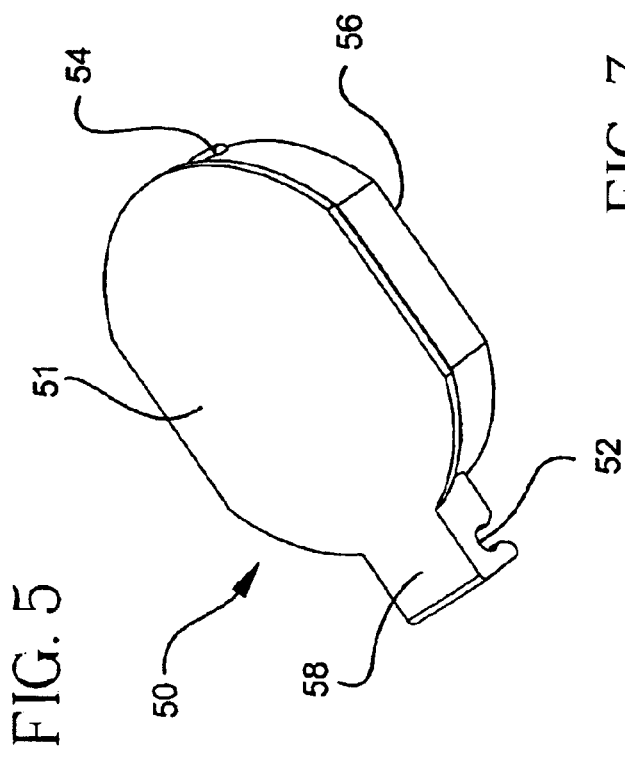
FIG. 5 shows a snap-on lid for the cover of the watertight poke-thru system.

FIG. 5 shows the lid 50 which has a substantially flat upper surface 51 that forms a flush surface with the cover 30 when the lid 50 is in the closed position. The lid 50 also has a continuous perimeter wall 56 extending downwardly from the upper surface 51 and enclosing the electrical or data receptacle. When the lid 50 is in the closed position, the perimeter wall 56 extends beyond the retaining walls 42 of the cover 30 and sealably contacts the gasket 20.

A member 58 extends outwardly from the continuous perimeter wall 56 on one end of the lid 50. The member 58 includes a pivot mechanism 52, preferably a slot, for opening and closing the lid 50. See FIGS. 1 and 5. The slot 52 snaps onto the pair of prongs 43 that extend outwardly from the opposing sides of the retaining wall 42 of the cutout 38. A similar snap-on pivoting mechanism is described in U.S. Pat. No. 2,605,926 to Casey, which is herein incorporated by reference in its entirety.

The lid 50 snaps closed into the cover 30 and is mechanically secured to the cover 30 by a snap-in mechanism 54 which seals the lid 50 to the gasket 20 and isolates the electrical receptacles or data/communication connectors. The snap-in mechanism 54 is located on the opposite end of the lid 50 from the pivot mechanism 52 and retains the lid 50 in the closed position. The snap-in mechanism 54 includes a raised portion of the continuous perimeter wall 56 which frictionally engages a recessed portion 46 of the retaining wall 42 around the edge of the cutout 38.

When a downward force is applied to the lid 50, the snap-in mechanism 54 slides into the recessed portion 46 of the retaining wall 42 and makes an audible snapping sound. This locks the lid 50 into the closed position. The lid 50 is opened by exerting sufficient upward force on the lid 50 to overcome the frictional force of the snap-in mechanism 54. The locking mechanism for lids previously used for receptacle covers does not exert sufficient force to retain the lid in a closed position when a gasket is used.

The snap-on lid 50 reduces the number of parts and the assembly time for the cover 30. Each lid 50 snaps onto a pair of prongs 43 which extend outwardly from the retaining walls 42 of the cutout 38. This configuration eliminates more complex mechanisms and improves assembly time. The lid 50 includes a continuous perimeter wall 56 that seals onto the gasket 12 around a duplex receptacle outlet. When the lid 50 is in the closed position, the continuous wall 56 extends downwardly slightly beyond the retaining wall 42 of the cover 30, to ensure a watertight seal when the lid 30 is in the closed position. The walls on prior art lids are not continuous and do not isolate the receptacle outlet. Moreover, these walls do not extend below the retaining walls of the cover and, therefore, do not form a tight seal with the gasket positioned between the cover and the base plate.

Figure 6:
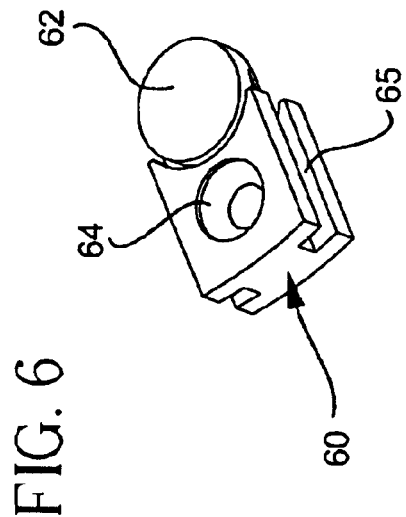
FIG. 6 shows a single data port that slides into the cover of the watertight poke-thru system.
Figure 7:
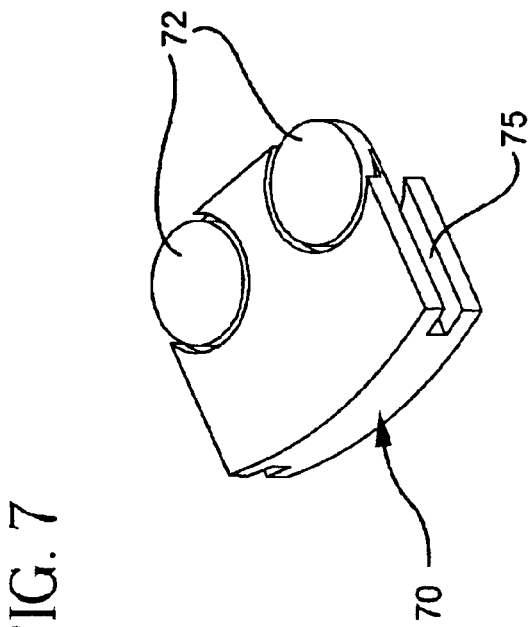
FIG. 7 shows a dual data port that slides into the cover of the watertight poke-thru system.

In another preferred embodiment, the cover 30 also includes single and/or duplex data port modules 60, 70 with data ports knockouts 62, 72 which provide access to data and/or communication connectors (see FIG. 1). The single and dual data port modules 60, 70 are slidably mounted in slots 34, 36 in the cover 30 and have breakaway knockouts 62, 72 which allow the passage of communication and/or data connectors. FIGS. 1, 6 and 7 show how the data port modules 60, 70 are constructed with recessed side walls 65, 75 which slidably engage tracks 35, 37 that extend outwardly from the sides of the slots 30. The side walls 65, 75 are reinforced to provide increased rigidity and a tight seal with the gasket 20.

The slidably removable data port modules 60, 70 can be replaced with slidably removable blanks (not shown in figures) which do not have any poke-thru data port knockouts. Replacing the poke-thru data port modules 60, 70 with blanks reconfigures the cover 30 for applications where data and/or communication connectors are not being used. In the embodiment shown in FIG. 1, the single data port module 60 includes a recessed through hole 64 for one of the mounting screws 13 which secures the single data port module 60 in place when the cover 30 is installed in the base plate 12. The dual data port module 70 is secured in place by a locking mechanism 39 located in the retaining wall 42 around the edge of the slot 36. The locking mechanism 39 extends outwardly and frictionally engages the recessed side wall 75 of the dual data port module 70.

The recessed side walls 65, 75 of the data port modules 60, 70 extend downwardly to provide surfaces for sealing the gasket 20. The data port modules 60, 70 also provide reinforcement for the cover 30 to ensure stiffness and a watertight fit with the gasket 20.

The base plate 12 of the present invention (see FIG. 2) is formed to fit over the electrical receptacle(s) and/or data connector(s) and provide a smooth transition between the floor and the cover 30. The base plate 12 includes an integral mounting plate 14 which is recessed from the top surface 17 of the base plate 12 and joined to the top surface 17 by a continuous wall 18. In preferred embodiments, the base plate 12 is formed as a one-piece, cast or molded structure which includes the top surface 17, the continuous wall 18 and the mounting plate 14. The mounting plate 14 has a continuous shoulder extending outwardly from the base of the wall 18 which allows the perimeter of the gasket 20 to be seated continuously on the mounting plate 14 and ensure a watertight seal.

The gasket 20 and the cover 30 are positioned on the mounting plate 14 and secured by screws 13 which engage pre-drilled holes 15 in the mounting plate 14. The mounting plate 14 can have a variety of different openings 19 to accommodate the different types of electrical receptacles and data/communication connectors that may be used and pre-drilled holes 11 for mounting the receptacles and connectors. The gasket 20 has openings 24 for the electrical receptacles and data/communication connectors, as well as holes 22 for the mounting screws 13. When the cover 30 is secured to the mounting plate 14, the retaining walls 42 and ribs 44 of the cover 30 form a tight seal with the gasket 20 around the openings 19 in the mounting plate 14.

In one embodiment, a web 16 is detachably attached across the opening 19 in the mounting plate 14 to provide a plurality of openings which correspond to the lids 50 and poke-thru data port knockouts 62, 72 in the cover 30. The web 16 provides structural reinforcement for the mounting plate 14 and increases the sealing surface for the gasket 20 in the areas between the electrical receptacle outlets and/or the data/communication ports. Preferably, the web 16 is I-shaped and can be detached from the mounting plate 14 to allow a cover 30 with a different lid(s)/data port(s) configuration to be used with the base plate 12. The detachable web 16 permits a variety of different electrical receptacles and fixtures, as well as data ports to be used with the same base plate 12.

In a preferred embodiment, the cover 30 uses three mounting screws 13 equidistantly spaced at intervals of about 120° C. The three screws 13 symmetrically distribute the compression load of the cover 30 onto the gasket 12, ensuring a watertight seal. In addition, the cover 30 can include integrally molded bosses 48 which allow the screws to pass through the cover 30 and engage the mounting plate 14. These bosses 48 are cylindrically-shaped and extend downwardly from the lower surface 41 of the cover 30 and form part of the retaining wall/rib structure on the lower surface 41 of the cover 30. The bosses 48 provide the cover 30 with structural strength and stiffness and reduce deflection of the cover 30 from the screw load. The through holes 32 for the bosses 48 are recessed in the upper surface 31 of the cover 30 to maintain a flush appearance.

Thus, while there have been described the preferred embodiments of the present invention, those skilled in the art will realize that other embodiments can be made without departing from the spirit of the invention, and it is intended to include all such further modifications and changes as come within the true scope of the claims set forth herein.

We claim:

1. A watertight modular system for floor-mounted electrical and/or data receptacles comprising:

a cover having a generally flat upper surface, a lower surface, and a cutout adapted to expose an electrical or data receptacle, wherein said lower surface comprises a plurality of retaining walls extending downwardly from said lower surface and defining a plurality of enclosed regions;

a lid shaped to fill and cover said cutout, wherein said lid comprises a pivot mechanism at a first end for mounting said lid flush with the upper surface of said cover when in a closed position and for exposing said receptacle when in an open position, a snap-in mechanism at a second end for providing a positive hold in the closed position, and a continuous perimeter wall extending downwardly and beyond said retaining walls when said lid is in a closed position;

a gasket having a cutout adapted to expose said electrical or data receptacle; and a base plate having a top surface and a central portion recessed from said top surface for receiving said gasket and cover;

wherein when said base plate, gasket and cover are assembled, said top surface is flush with said upper surface and said retaining walls and said continuous perimeter wall sealably contact said gasket.

2. The watertight modular system in accordance with claim 1, wherein said cutout is defined by a first continuous retaining wall extending downwardly from said lower surface.

3. The watertight modular system in accordance with claim 2, wherein said pivot mechanism comprises a slot and wherein two prongs extend outwardly from opposing sides of said first continuous retaining wall and pivotably engage said slot.

4. The watertight modular system in accordance with claim 1, wherein said cover further comprises a data port module which slidably engages a slot in said cover, and wherein a second continuous retaining wall extends downwardly from said lower surface of said cover and defines said slot.

5. The watertight modular system in accordance with claim 1, wherein said gasket is formed from a resilient, waterproof material.

6. The watertight modular system in accordance with claim 1, wherein said central portion is defined by a continuous wall extending downwardly from said upper surface and comprises a shoulder extending inwardly from said wall to define an opening.

7. The watertight modular system in accordance with claim 6, wherein a detachable web is connected to said shoulder and extends across said opening to form a plurality of openings.

8. The watertight modular system in accordance with claim 1, wherein said cover is made from a non-metallic material.

9. The watertight modular system in accordance with claim 1, wherein said gasket is made from a rubber or an elastomeric material.

10. A watertight modular system for floor-mounted electrical and data receptacles comprising:

a cover having a generally flat upper surface, a lower surface, and a pair of cutouts adapted to expose a pair of electrical receptacles, wherein said lower surface comprises a plurality of retaining walls extending downwardly from said lower surface and defining a plurality of enclosed regions;

a pair of lids shaped to fill and cover said cutouts, wherein each of said lids comprises a pivot mechanism at a first end for mounting said lid flush with the upper surface of said cover when in a closed position and for exposing said receptacle when in an open position, a snap-in mechanism at a second end for providing a positive hold in the closed position, and a continuous perimeter wall extending downwardly and beyond said retaining walls when said lid is in a closed position;

a gasket having a cutout adapted to expose said electrical receptacles; and a base plate having a top surface and a central portion recessed from said top surface for receiving said gasket and cover;

wherein when said base plate, gasket and cover are assembled, said top surface is flush with said upper surface and said retaining walls and said continuous perimeter wall sealably contact said gasket.

11. The watertight modular system in accordance with claim 10, wherein each of said cutouts is defined by a continuous retaining wall extending downwardly from said lower surface.

12. The watertight modular system in accordance with claim 11, wherein each of said pivots comprises a slot and wherein two prongs extend outwardly from opposing sides of said continuous retaining wall and pivotably engage said slot.

13. The watertight modular system in accordance with claim 10, wherein said cover further comprises a data port module which slidably engages a slot in said cover, and wherein a continuous retaining wall extends downwardly from said lower surface of said cover and defines said slot.

14. The watertight modular system in accordance with claim 10, wherein said gasket is formed from a resilient, waterproof material.

15. The watertight modular system in accordance with claim 10, wherein said central portion is defined by a continuous wall extending downwardly from said upper surface and comprises a shoulder extending inwardly from said wall to define an opening.

16. The watertight modular system in accordance with claim 15, wherein a detachable web is connected to said shoulder and extends across said opening to form a plurality of openings.

17. The watertight modular system in accordance with claim 10, wherein said cover is made from a non-metallic material.

18. The watertight modular system in accordance with claim 10, wherein said gasket is made from a rubber or an elastomeric material.

19. A watertight modular system for floor-mounted electrical and/or data receptacles comprising:

a cover having a generally flat upper surface, a lower surface, and a cutout adapted to expose an electrical or data receptacle, wherein said lower surface comprises a plurality of retaining walls extending downwardly from said lower surface and defining a plurality of enclosed regions, and wherein said cutout is defined by a first continuous retaining wall extending downwardly from said lower surface;

a lid shaped to fill and cover said cutout, wherein said lid comprises a pivot mechanism at a first end for mounting said lid flush with the upper surface of said cover when in a closed position and for exposing said receptacle when in an open position, a snap-in mechanism at a second end for providing a positive hold in the closed position, and a continuous perimeter wall extending downwardly and beyond said retaining walls when said lid is in a closed position, wherein said pivot mechanism comprises a slot and wherein two prongs extend outwardly from opposing sides of said first continuous retaining wall and pivotably engage said slot;

a gasket having a cutout adapted to expose said electrical or data receptacle, wherein said gasket is formed from a resilient, waterproof material;

a base plate having a top surface, a bottom surface and a central portion recessed from said top surface for mounting said electrical or data receptacle and adapted to accept said gasket and cover;

a slidably removable knockout for exposing one or more data receptacles, wherein said slidably removable knockout is defined by a second continuous retaining wall extending downwardly from said lower surface; and wherein when said base plate, gasket and cover are assembled, said top surface is flush with said upper surface and said retaining walls and said continuous perimeter wall sealably contact said gasket.

20. The water modular system in accordance with claim 19, wherein said cover is made from a non-metallic material, and wherein said gasket is made from a rubber or an elastomeric material.

* * * * *